United States Patent
Garcia

(10) Patent No.: US 10,043,200 B2
(45) Date of Patent: Aug. 7, 2018

(54) SYSTEM AND PROCESS FOR GENERATING USER BASED VIRTUAL RECOMMENDATION FROM USER CONTACT SOURCES

(71) Applicant: John Andrew Garcia, West Hills, CA (US)

(72) Inventor: John Andrew Garcia, West Hills, CA (US)

(*) Notice: Subject to any disclaimer, the term of this patent is extended or adjusted under 35 U.S.C. 154(b) by 464 days.

(21) Appl. No.: 14/856,293

(22) Filed: Sep. 16, 2015

(65) Prior Publication Data

US 2016/0239882 A1 Aug. 18, 2016

Related U.S. Application Data

(60) Provisional application No. 62/116,196, filed on Feb. 13, 2015.

(51) Int. Cl.
| | |
|---|---|
| *G06Q 30/06* | (2012.01) |
| *G06Q 30/02* | (2012.01) |
| *G06Q 50/00* | (2012.01) |

(52) U.S. Cl.
CPC ..... *G06Q 30/0282* (2013.01); *G06Q 30/0625* (2013.01); *G06Q 30/0631* (2013.01); *G06Q 30/0643* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 8,112,720 B2* | 2/2012 | Curtis | ............ | G06F 3/0482 |
| | | | | 715/786 |
| 8,812,592 B2* | 8/2014 | Deng | ............ | G06Q 30/02 |
| | | | | 705/319 |
| 9,141,705 B2* | 9/2015 | Lai | ............ | G06F 17/30867 |
| 9,373,140 B2* | 6/2016 | Bao | ............ | G06Q 30/0631 |
| 9,460,092 B2* | 10/2016 | Murphy | ............ | G06F 17/30038 |
| 2007/0058858 A1* | 3/2007 | Harville | ............ | A45D 44/005 |
| | | | | 382/165 |
| 2008/0126476 A1* | 5/2008 | Nicholas | ............ | G06Q 10/10 |
| | | | | 709/203 |
| 2008/0178239 A1* | 7/2008 | Yampanis | ............ | H04L 41/5064 |
| | | | | 725/110 |
| 2008/0250312 A1* | 10/2008 | Curtis | ............ | G06Q 10/00 |
| | | | | 715/700 |

(Continued)

OTHER PUBLICATIONS

Chen, L., et al., "Interaction Design Guidelines on Critiquing-Based Recommender Systems," User Modeling and User-Adapted Interaction, vol. 19, No. 3, pp. 167-206, Dordrecht: Springer Science and Business Media (Aug. 2009).*

*Primary Examiner* — Nicholas D Rosen
(74) *Attorney, Agent, or Firm* — Plager Schack LLP

(57) ABSTRACT

A system and process provides consumers with product or services virtual recommendations from a list of contacts. In response to the consumer searching for or browsing a product or service, the system searches through stored contacts that have also interacted with the searched/browsed product or service. A virtual recommendation may be provided to the consumer based on the contacts' interaction with the product or service. In some embodiments, the virtual recommendation is displayed as a list of the contacts that had a previous consumer interaction with the product or service.

14 Claims, 5 Drawing Sheets

(56) References Cited

U.S. PATENT DOCUMENTS

| | | | | |
|---|---|---|---|---|
| 2010/0191619 A1* | 7/2010 | Dicker | ............... | G06Q 30/02 705/26.1 |
| 2010/0318551 A1* | 12/2010 | Lai | ................ | G06F 17/30699 707/765 |
| 2010/0318919 A1* | 12/2010 | Murphy | ............ | G06F 17/30038 715/745 |
| 2011/0060627 A1* | 3/2011 | Piersol | ............ | G06Q 10/06395 705/7.31 |
| 2012/0253972 A1* | 10/2012 | Oskolkov | .............. | G06Q 30/02 705/26.8 |
| 2013/0031162 A1* | 1/2013 | Willis | ................ | H04L 65/1069 709/203 |
| 2013/0031173 A1* | 1/2013 | Deng | .................. | G06Q 30/02 709/204 |
| 2013/0031177 A1* | 1/2013 | Willis | ................ | H04L 65/1069 709/204 |
| 2013/0031216 A1* | 1/2013 | Willis | ................ | H04L 65/1069 709/219 |
| 2014/0149248 A1* | 5/2014 | Bao | ....................... | G06Q 50/01 705/26.7 |
| 2014/0250105 A1* | 9/2014 | Shankar | ........... | G06F 17/30867 707/722 |
| 2014/0351354 A1* | 11/2014 | Chandra | .............. | H04L 51/046 709/206 |
| 2015/0205822 A1* | 7/2015 | Jain | ................ | G06F 17/30289 707/803 |
| 2015/0356082 A1* | 12/2015 | Perdue | .............. | G06Q 30/0631 707/734 |

* cited by examiner

SYSTEM AND PROCESS FOR GENERATING USER BASED VIRTUAL RECOMMENDATION FROM USER CONTACT SOURCES

CROSS-REFERENCE TO RELATED APPLICATIONS

This application claims benefit under 35 U.S.C. § 119(e) of U.S. Provisional Application having Ser. No. 62/116,196 filed Feb. 13, 2015, which is hereby incorporated by reference herein in its entirety.

BACKGROUND

The embodiments herein relate generally to systems and processes for generating a user based virtual recommendation from user contact sources.

With the advent of online communication, consumers rely on others' opinions to help determine whether a product or service should be purchased. Conventionally, people rely on others' reviews, ratings, or positive indicators (for example, a "thumbs up" rating). First, when reviewing a product or service online, the current systems or methodologies provides an output which is a list in which a person can read feedback from a customer one by one (a review), view a list ranking of previous customers ratings from best to worst, view a list ranking of products or services from best to worst (or recommended products or services), or merely just view a numerical total number of positive indications (e.g., the number of thumbs up). Such conventional approaches are discrete with the systems working independently from each other. A problem with discrete systems is one person can have many ways in which he/she has communicated an opinion about something. To illustrate, one person can rate a product, they can then write a review, and then give a thumbs up. One day, the person may have a good experience and give a thumbs up, a year later a bad experience and give a poor rating, and a year later after that have an average experience and write an average review. This is a problem for a consumer looking for a reference because there are now three references on three systems from the same person that may not reflect an accurate and current view of the experience. The current system approaches are largely "disaggregated" since they are discrete "events" independent of each other. Second, the current system approaches are commonly a compilation of submissions from a variety of uncontrolled sources. Uncontrolled sources present problems as it is becoming more clear that reviews, ratings, and thumbs up can be purchased and performed by professional "raters", which reduces "reliability" in the rating or review. For example, the current system allows a user to write a review or provide a rating and in most cases it is not clear or even checked if the person has in fact ever used the product or service. It some cases, current online approaches to providing consumer opinion on a product/service can be manipulated by individuals and computing "bots" to provide unreliable opinions (either good or bad) or can be skewed by redundant input from the same previous consumer. Third, current approaches are largely static at a point in time and lack a means to update. A user writes a review and that review is for a service provided at a point in time and generally not amended based on future reviews. Therefore, these systems are less reliable because many reviews from the same person over a period of time become "dilutive" to the overall rating system. Fourth, the current systems do not even consider non user input behavioral implied ratings. An example of this is a repeat customer. A repeat customer is the best indication of a happy customer.

As can be seen, there is a need for a system that uses an integrated approach to incorporating the many ways in which people rate, review or otherwise recommend a product or service and improves the reliability of a recommendation.

SUMMARY

In one aspect, a computer program product for generating an online user recommendation for a product or service comprises a non-transitory computer readable storage medium having computer readable program code embodied therewith, the computer readable program code being configured to: receive a message indicating the product or service is associated with an online search by a user; access an aggregated list of contacts associated with the user; search the aggregated list of contacts for recorded online consumer events performed by members of the aggregated list of contacts, wherein the online consumer events comprise consumer interaction with the product or service; and provide the user with a virtual recommendation associated with the product or service based on the recorded online consumer events performed by members of the aggregated list of contacts.

In another aspect, a computer program product for generating an online user recommendation for products or services, comprises a non-transitory computer readable storage medium having computer readable program code embodied therewith, the computer readable program code being configured to: search a user's computing device for a stored list of contact sources; compile the list of contact sources into a stored list of aggregated contacts; search the stored list of aggregated contacts for recorded online consumer events performed by members of the list aggregated of contacts, wherein the online consumer events comprise consumer interaction with products or services; determine a virtual recommendation associated with products or services based on the recorded online consumer events performed by members of the aggregated list of contacts; and display the virtual recommendation associated with products or services for presenting to user in response to the user performing online browsing of a product or service, wherein the virtual recommendation is displayed as a name(s) or an icon(s) of members of the aggregated list of contacts having had a recorded online consumer event with the product or service.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In general, embodiments of the disclosed subject technology solve a problem associated with computing network "rating, review, or other feedback" generation systems. As described above, conventional computing ratings systems are not fully integrated into a comprehensive system and are generally subject to influence that creates unreliability in the review/rating output. Embodiments described herein provide an output in the form of a single reference list of user friends, user defined community, and chosen experts as a virtual recommendation representative of an endorsement (or to the contrary, disapproval) of a product or service based upon defined user "events". Some embodiments also optimize the output based on weightings and behavioral patterns. Embodiments of the subject technology generates a reliable recommendation (either positive or negative) for a product or service (also referred to as a "virtual recommendation") based on the experience of a user's known list of contacts and/or list of sources from whom the user considers reliable and are familiar with the product or service. In some embodiments, the recommendation (which under one product name is called a "Favo"), is meant to signify a preference for using a product or a service provider as a virtual recommendation or reference. In an exemplary embodiment, a browsed or searched product invokes a search through the user's contact sources for members who have had some kind of consumer experience with the product (referred to herein as a "consumer event"), whereby a "virtual recommendation" has been created, and generates the output as a list of contact source members having "virtual recommendation" from previous consumer events (in general, a positive experience) with the subject product or service. In other embodiments, the recommendation may be accompanied by or represented by either simply a positive or negative symbol (for example, a rating symbol may be used such as a "green light or red flag", "+ or −", "red radio button or green radio button", etc.). As described more fully below, the virtual recommendation may be generated based on the sum of weighted "events" associated with a user's cumulative actions in connection with such events for the product or service and cross referenced with the user's contacts (or list of people generated by the processes described below).

Figure 1:
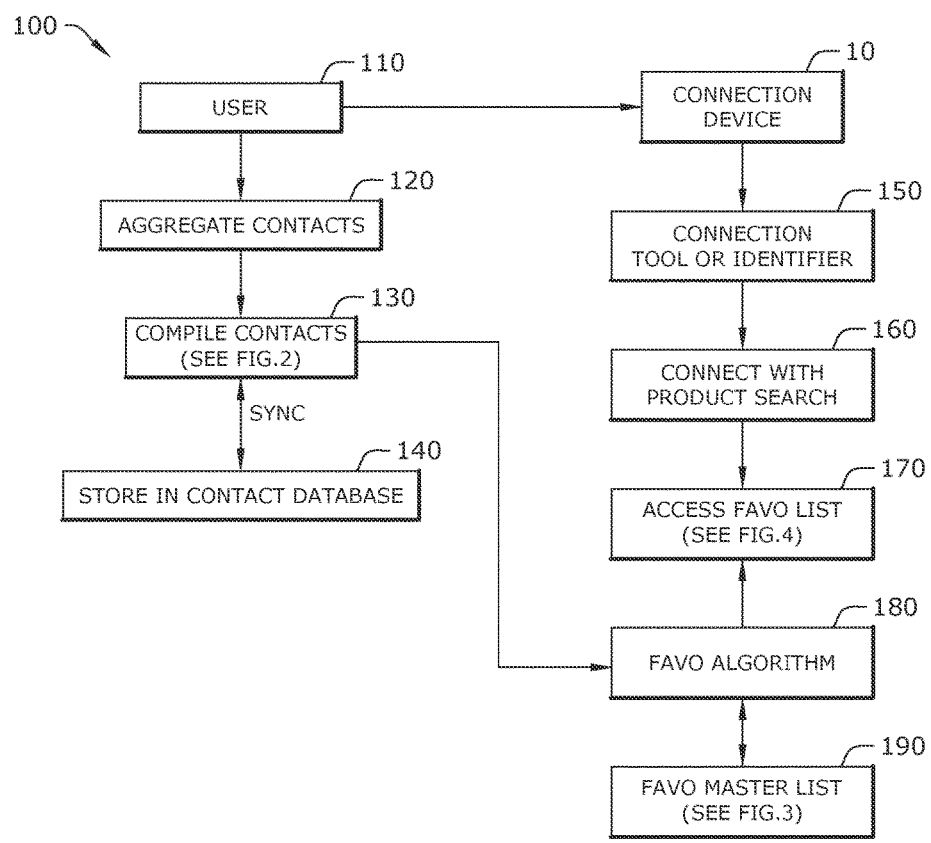
FIG. 1 is a flowchart of a process for generating a recommendation from known users according to an embodiment of the subject technology.

Referring now to FIG. 1, a system 100 for generating an online user recommendation for a product or service is shown according to an exemplary embodiment of the subject technology. A user 110 may operate a computing device 10 to search or browse online for a product or service. Embodiments of the subject technology may generally be embodied within the computing device 10 as a software application.

Figure 2:
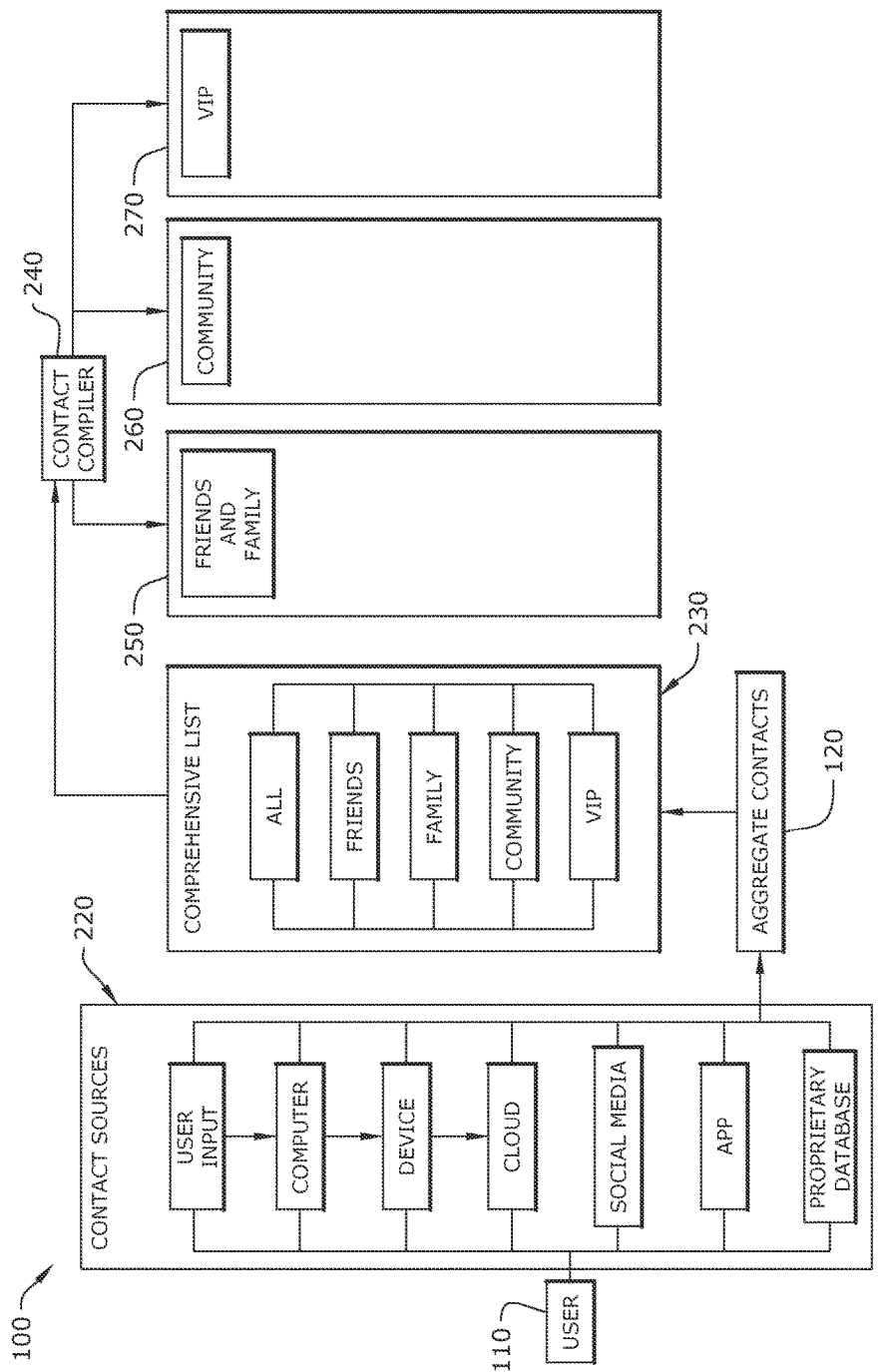
FIG. 2 is a flowchart of a process for compiling contacts to generate the recommendation of FIG. 1 according to an embodiment of the subject technology.

Referring now concurrently to FIGS. 1 and 2, in a set-up phase, the system 100 may in block 120 search the user's computing device 10 for contact sources 220. The contact sources 220 may be extracted from for example, user input data, stored computer records/databases, cloud networks, metadata from social media activity, a contacts application, and/or a proprietary database of stored files. In one aspect of the subject technology, the process establishing the proprietary database may be a new and useful feature. The proprietary database of contacts may be generated by: synchronizing with a device's stored user contacts (phone, computer, or other third party contact list storage such as Google contacts which may then be designated as "friends"; locating members of the system 100 via a virtual boundary whose distance may be defined by the user and the user's current location and a GPS location tool, the members of which may be designated as part of the user's community; data mining the user's online activities for individuals (for example, celebrities or experts) followed by the user from within a device running the system 100; and/or manual addition of contacts into the system 100 by the user. In block 120, the system 100 may aggregate the contacts from the contact sources 220 into a list of aggregated contacts 230 thereby eliminating any double counting of contacts held in multiple user contact sources. Contact sources may be extracted from, for example, individuals listed as friends, defined members of the user's community, and defined list of experts.

Figure 4:
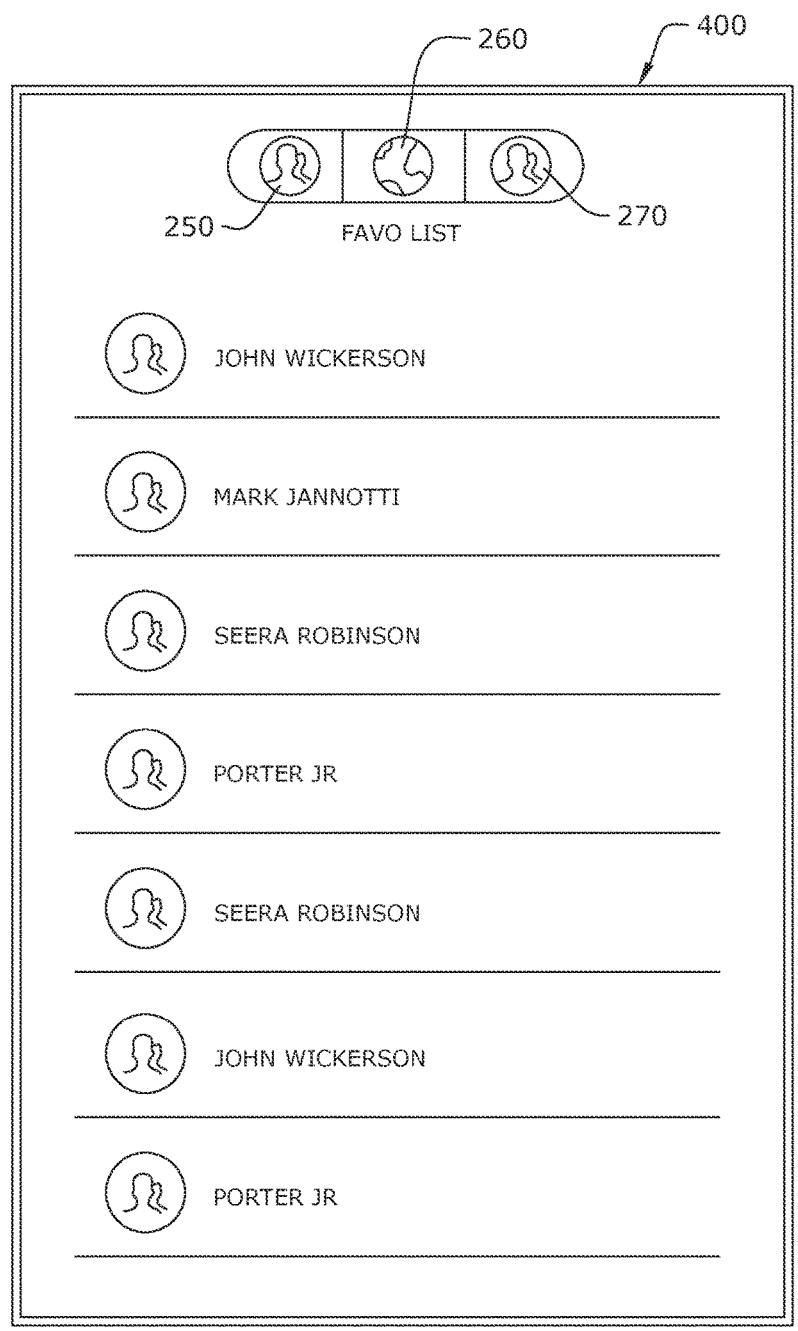
FIG. 4 is a screenshot of a user interface showing contacts and a menu of contact sources according to an embodiment of the subject technology.

The output (virtual recommendation) may be a single list of the user's contacts, user defined community, or user defined list of experts. In some embodiments, the aggregated contacts 230 may be compiled via a contact compiler module 240 into tiers or groups by contact type. For example, contacts may be grouped by friends and family 250, community contacts 260, and VIP contacts 270. As shown in and referring briefly to FIG. 4, a user interface 400 may display the virtual recommendation for a product or service according to the contacts within a selected group list. As shown, the virtual recommendation is a result of members within the friends and family list having had a previous consumer event with the product or service. The output may be displayed as a list of names or icons representing the members having had the previous consumer event with the product or service. In some embodiments, the user may want output shown according to a selected group within the aggregated contacts 230. Selectable icons may represent the friends and family group 250, community group 260, and the VIP group 270. While not shown, it will be understood that the user may select a different group list (for example, community group 260 or VIP group 270) and a different output of members providing the virtual recommendation will be shown (depending on which members, if any, had prior experience with the product or service). The community group 260 may include for example, a user defined region of system users within a selected range from the user (for example, users within a 10 mile radius) or may include members from a social media group following. The VIP group 270 may include individuals the user manually designates as being included within his/her contacts or identified from within the system under criteria such as experts which can be found via the user's activity related to interacting with a newsletter or online forum. In some embodiments, the compiled list of contacts may be referred to as the user's FAVO list which represent other users participating in the system 100 or are at least trusted sources of opinion and product/service review. The compiled contacts may by updated periodically and synchronized with the user's computing device 10 in block 140.

Figure 3:
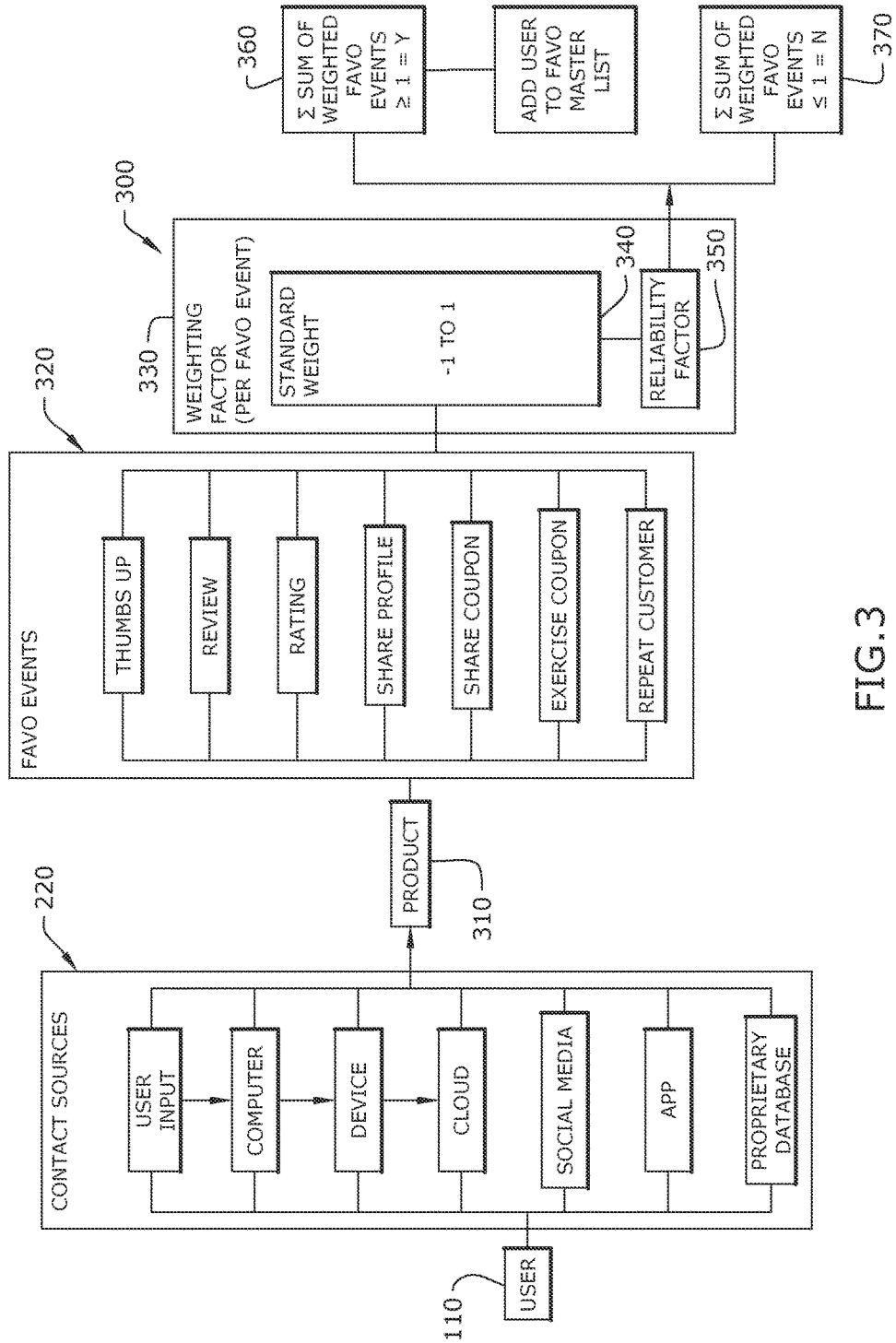
FIG. 3 is a flowchart of a process for adding a user event to a user's file of recommendations according to an embodiment of the subject technology.

Referring back now to FIG. 1 along with FIG. 3, the system 100 may recognize that a product or service 310 search or browsing session has been invoked and a connection tool or identifier module 150 may initiate one or more processes related to the system 100. In block 160, the system 100 may identify the subject product or service. In block 170 the list of aggregated contacts may be accessed.

In block 180, the system 100 may search for recorded online consumer events 320 performed by members of the aggregated list of contacts 230 (FIG. 2). The online consumer events 320 (sometimes referred to as FAVO events) may comprise consumer interaction with products or services. The consumer interaction may be online based however some interaction may be in-person and recorded somehow online (e.g., a payment made for purchase). Generally the consumer interaction directly or indirectly forms the basis for a consumer event and the sum total of consumer events form the basis for a virtual recommendation (sometimes referred to as a FAVO rating) generated by process 300. Examples of consumer interaction may include: providing a "thumbs up/thumbs down" rating; providing an online review; providing a general rating such as on a numbered or satisfaction scale; sharing a profile associated with products or services; sharing a coupon associated with products or services; exercising or using an online coupon associated with products or services; and purchase history including repeating the purchase of products or services. It will be understood that other online activity associated with products or services may be used in determining a rating under the virtual recommendation. In an exemplary embodiment, the virtual recommendation may account for consumer events 320 that skew or bias the rating. In some embodiments, the virtual recommendation may use a standard weight 340 reflecting a measurement from −1 to 1 for each consumer event where −1 means dislike and 1 means like. A reliability factor module 350 may be applied to the standard weight 340 to account for bias or anomalies in the consumer event 350, including, but not limited to, to account for time decay, to weight more recent events more heavily than older events, or other behavioral adjustments related to a particular user that generated the respective event. The reliability factor may be based on time, verified transaction(s), type of consumer event, the number of consumer events, and post referral consumer event data. Weighted consumer events 330 for a same product or service from each contact list member may be summed in blocks 360 and 370. If the weighted sum of consumer events results in the creation of a "virtual recommendation", such "virtual recommendation" may be enhanced such that (a) greater than or equal to 1, then the product or service may receive a positive rating (or recommendation) or (b) less than or equal to −1, then the product or service may receive a negative rating (or recommendation), and the contact may be added in block 190 to the user's master list for the product or service. If the weighted sum of consumer events is less than or equal to −1, then the product or service may receive a negative rating (or recommendation). In between −1 and +1 may result in the user not showing up on the list. In some embodiments, the system 100 may update a contact's rating for a product or service (which may be updated during the synchronization process of block 140) for follow-up negative ratings. If a product or service received a negative value for a consumer event performed more recently than a previous online consumer event for the same product or service, then the system 100 may nullify or offset the previous online consumer event for the same product or service. In this situation, the virtual recommendation is more accurate than previous systems that would average out the previous positive rating with the new negative rating. As will be appreciated, aspects of the rating approaches above provide the end user with the general consensus as to whether to purchase a product or service from trusted sources rather than having to filter from the opinions of strangers. The system is also more useful than current systems because it aggregates discrete events and the many ways in which people rate, review, or otherwise express and opinion about a product and adjusts such events into a single "virtual recommendation" to provide people with a more meaningful list of references that are specific and unique to each individual user. So, no matter how many discrete user events are created, the output will be the person or list of persons that created such event(s) either positive or negative as defined that results in the creation of a "virtual recommendation". Thus, the decision to purchase a product or service is distilled down to a convenient representation of persons familiar and trusted by the user.

Figure 5:
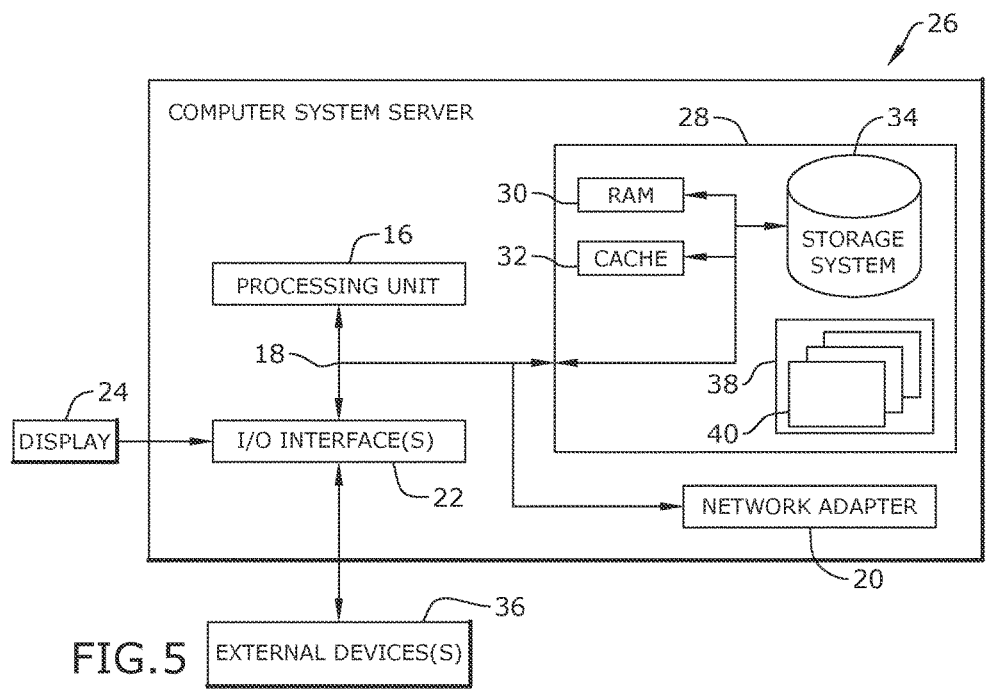
FIG. 5 is a block diagram of a computer system/server according to an embodiment of the subject technology.

Referring now to FIG. 5, a schematic of an example of a computer system/server 10 is shown. The computer system/server 10 is shown in the form of a general-purpose computing device. The computer system/server 10 may serve the role as the machine implementing for example the functions of storing computer program product embodiments of the subject technology, storing contact information, searching for and accessing consumer events, calculating ratings based on the consumer events, updating lists, and providing ratings for products or services. The components of the computer system/server 10 may include, but are not limited to, one or more processors or processing units 16, a system memory 28, and a bus 18 that couples various system components including the system memory 28 to the processor 16.

The computer system/server 10 may be for example, personal computer systems, tablet devices, mobile telephone devices, wearable computing devices, server computer systems, handheld or laptop devices, multiprocessor systems, microprocessor-based systems, set top boxes, programmable consumer electronics, network PCs, and distributed cloud computing environments that include any of the above systems or devices, and the like. The computer system/server 10 may be described in the general context of computer system executable instructions, such as program modules, being executed by a computer system (described for example, below). In some embodiments, the computer system/server 10 may be a cloud computing node connected to a cloud computing network (not shown). The computer system/server 10 may be practiced in distributed cloud computing environments where tasks are performed by remote processing devices that are linked through a communications network. In a distributed cloud computing environment, program modules may be located in both local and remote computer system storage media including memory storage devices.

The computer system/server 10 may typically include a variety of computer system readable media. Such media could be chosen from any available media that is accessible by the computer system/server 10, including non-transitory, volatile and non-volatile media, removable and non-removable media. The system memory 28 could include one or more computer system readable media in the form of volatile memory, such as a random access memory (RAM) 30 and/or a cache memory 32. By way of example only, a storage system 34 can be provided for reading from and writing to a non-removable, non-volatile magnetic media device typically called a "hard drive" (not shown). The system memory 28 may include at least one program product 40 having a set (e.g., at least one) of program modules 42 that are configured to carry out the functions of embodiments of the invention. The program product/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described above.

The computer system/server 10 may also communicate with one or more external devices 14 such as a keyboard, a pointing device, a display 24, etc.; and/or any devices (e.g., network card, modem, etc.) that enable the computer system/server 10 to communicate with one or more other computing devices. Such communication can occur via Input/Output (I/O) interfaces 22. Alternatively, the computer system/server 10 can communicate with one or more networks such as a local area network (LAN), a general wide area network (WAN), and/or a public network (e.g., the Internet) via a network adapter 20. As depicted, the network adapter 20 may communicate with the other components of the computer system/server 10 via the bus 18.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 34) may be utilized. In the context of this disclosure, a computer readable storage medium may be any tangible or non-transitory medium that can contain, or store a program (for example, the program product 40) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 16 of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 6:
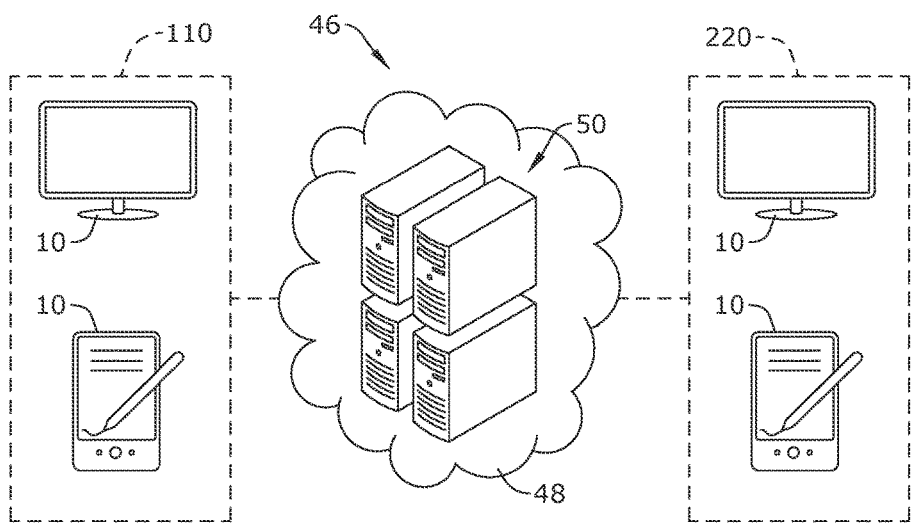
FIG. 6 is a block diagram of a network of users according to embodiments of the subject technology.

Referring now to FIG. 6, a block diagram of a system 46 for generating an online user recommendation for a product or service is shown. The system 46 may connect an end user 110 to one or more contact sources 220 through a network 48. The network 48 may include a server 50 storing a software embodiment of the disclosed invention. The user 110 and contact sources 220 may interact with the system 46 through respective general computing electronic devices 10 as described above with respect to FIG. 5. Browsing/searching of an online product or service may trigger the user's device 10 to access the server 50 for records of members within the contact sources 220 that have qualifying consumer events related to the user's product/service search.

This information may be transmitted back to the user 110 for processing within the device 10 for the virtual recommendation described previously. In some embodiments, the network 46 may be a cloud based environment.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A computer program product for a user interface generating an online user virtual recommendation for a product or service through a computing device display, the computer program product comprising a non-transitory computer readable storage medium having computer readable program code embodied therewith, the computer readable program code being configured to:
   receive a message indicating the product or service is associated with an online search by a user;
   access an aggregated list of contacts associated with the user;
   search the aggregated list of contacts for recorded online consumer events performed by members of the aggregated list of contacts, wherein the online consumer events comprise consumer interaction with the product or service;
   trigger, by a processor, a determination for a virtual recommendation associated with the product in response to the received message, the virtual recommendation associated with the product based on a standard weighting value and a reliability factor applied to the recorded online consumer events, the reliability factor being based on time, a verified transaction, a type of consumer event, a number of consumer events, and post referral consumer event data; and
   display the virtual recommendation associated with the product or service in the user interface, in response to the user performing the online search, wherein the virtual recommendation is displayed as a person's image or avatar, name(s) or an icon(s) of individual members of the aggregated list of contacts having had a recorded online consumer event used to create the virtual recommendation in connection with the product or service.

2. The computer program product of claim 1, wherein the virtual recommendation associated with the product or service is based on a weighted sum of values associated with the consumer interaction with the product or service.

3. The computer program product of claim 2, further comprising computer readable program code configured to determine whether the virtual recommendation is positive or negative based on a calculation of the weighted sum.

4. The computer program product of claim 3, further comprising computer readable program code configured to:
   determine whether one of the online consumer events from one of the members of the aggregated list of contacts results in a negative value;
   determine whether said one of the online consumer events resulting in the negative value was performed more recently than a previous online consumer event for a same product or service; and
   nullify or offset a rating associated with the previous online consumer event for the same product or service in the calculation of the weighted sum.

5. The computer program product of claim 1, wherein the online consumer events include a product or service review and a product or service rating.

6. The computer program product of claim 1, wherein the aggregated list of contacts includes a list of friends.

7. The computer program product of claim 1, wherein the aggregated list of contacts includes a community group determined by a virtual boundary whose distance is defined by the user's current location and a GPS location tool.

8. The computer program product of claim 1, further comprising computer readable program code configured to search through memory in a computing device storing the computer program product for stored contact sources, the stored contact sources being used to generate the aggregated list of contacts.

9. The computer program product of claim 8, further comprising computer readable program code configured to periodically search the stored contact sources for an updated list of recorded online consumer events and update a list of rated products or services with the updated list of recorded online consumer events.

10. A computer program product for a user interface generating an online user recommendation for products or services through a computing device display, the computer program product comprising a non-transitory computer readable storage medium having computer readable program code embodied therewith, the computer readable program code being configured to:
    search a user's computing device for a first stored list of contact sources, and search a database for a second stored list of contact sources who are within a user defined community;
    compile the first stored list of contact sources and second stored list of contact sources into a stored list of aggregated contacts, wherein the aggregated list of contacts includes a community group determined by a virtual boundary whose distance is defined by a current location of the user and a GPS location tool;
    search the stored list of aggregated contacts for recorded online consumer events performed by members of the aggregated list of contacts, wherein online consumer events comprise consumer interaction with products or services;
    determine a virtual recommendation associated with products or services based on the recorded online consumer events performed by members of the aggregated list of contacts; and
    display the virtual recommendation associated with products or services for presenting to the user in response to the user performing online browsing of a product or service, wherein the virtual recommendation is displayed as a person's image or avatar, name(s) or an icon(s) of individual members of the aggregated list of contacts having had a recorded online consumer event used to create the virtual recommendation in connection with the product or service.

11. The computer program product of claim 10, wherein the virtual recommendation associated with products or services is based on a weighted sum of values associated with the consumer interaction with one of the products or services.

12. The computer program product of claim 11, further comprising computer readable program code configured to determine whether the virtual recommendation is positive or negative based on a calculation of the weighted sum.

13. The computer program product of claim 12, further comprising computer readable program code configured to:
    determine whether a negative rating of one of the online consumer events was performed more recently than a previous online consumer event for a same product or service; and
    nullify or offset a rating associated with the previous online consumer event for the same product or service in the calculation of the weighted sum.

14. The computer program product of claim 10, wherein the online consumer events include a product or service review and a product or service rating.

* * * * *